(12) United States Patent
Kim et al.

(10) Patent No.: US 7,987,463 B2
(45) Date of Patent: Jul. 26, 2011

(54) DEVICE MANAGEMENT SCHEDULING METHOD AND APPARATUS THEREOF

(75) Inventors: Te-Hyun Kim, Gyeonggi-Do (KR); Pablo Hernandez, Paris (FR)

(73) Assignee: LG Electronics Inc., Seoul (KR)

( * ) Notice: Subject to any disclaimer, the term of this patent is extended or adjusted under 35 U.S.C. 154(b) by 1221 days.

(21) Appl. No.: 11/655,898

(22) Filed: Jan. 22, 2007

(65) Prior Publication Data

US 2007/0174446 A1   Jul. 26, 2007

Related U.S. Application Data

(60) Provisional application No. 60/760,942, filed on Jan. 23, 2006, provisional application No. 60/762,517, filed on Jan. 27, 2006.

(30) Foreign Application Priority Data

May 12, 2006   (KR) .................. 10-2006-0043155
Jan. 18, 2007   (KR) .................. 10-2007-0005821

(51) Int. Cl.
*G06F 9/46* (2006.01)
*G06F 15/16* (2006.01)
*G06F 15/173* (2006.01)

(52) U.S. Cl. ........ 718/100; 718/102; 709/201; 709/203; 709/223; 709/224; 709/227; 709/228

(58) Field of Classification Search .................. 718/100, 718/101, 102
See application file for complete search history.

(56) References Cited

U.S. PATENT DOCUMENTS

| | | | |
|---|---|---|---|
| 5,063,523 A * | 11/1991 | Vrenjak | ................... 709/223 |
| 6,125,388 A | 9/2000 | Reisman | |
| 6,175,832 B1 | 1/2001 | Luzzi et al. | |
| 6,263,358 B1 * | 7/2001 | Lee et al. | ................... 718/100 |
| 6,426,959 B1 | 7/2002 | Jacobson et al. | |
| 6,664,978 B1 | 12/2003 | Kekic et al. | |
| 6,757,897 B1 * | 6/2004 | Shi et al. | ................... 718/102 |
| 6,950,864 B1 | 9/2005 | Tsuchiya | |
| 6,978,302 B1 | 12/2005 | Chisholm et al. | |
| 7,523,155 B2 | 4/2009 | Hayes, Jr. | |
| 7,752,296 B2 | 7/2010 | Kim | |
| 2003/0236823 A1 * | 12/2003 | Patzer et al. | ................... 709/203 |
| 2004/0204978 A1 | 10/2004 | Rayrole | |
| 2005/0216222 A1 | 9/2005 | Inoue | |
| 2005/0289229 A1 | 12/2005 | Kim | |

(Continued)

FOREIGN PATENT DOCUMENTS

| | | |
|---|---|---|
| JP | 2005-234736 A | 9/2005 |
| KR | 10-2005-0046932 A | 5/2005 |
| WO | WO-00-38033 A2 | 6/2000 |
| WO | WO-2006/006803 A1 | 1/2006 |

*Primary Examiner* — Jennifer N To
(74) *Attorney, Agent, or Firm* — Birch, Stewart, Kolasch & Birch, LLP

(57) ABSTRACT

Device management commands to be executed within a terminal and conditions included within a scheduling context for executing such commands are provided to the terminal ahead of time. A server generates a scheduling context (or other type of scheduling information) that includes device management scheduled by the server to allow more effective scheduling to be performed by the terminal. A terminal receives the scheduling context from the server and performs the scheduled device management procedures accordingly.

36 Claims, 7 Drawing Sheets

U.S. PATENT DOCUMENTS

| | | |
|---|---|---|
| 2006/0015626 A1 | 1/2006 | Hallamaa et al. |
| 2006/0041652 A1 | 2/2006 | Cowham |
| 2006/0190608 A1 | 8/2006 | Sahinoja et al. |
| 2007/0011681 A1 * | 1/2007 | Shu et al. ............... 718/102 |
| 2007/0106770 A1 | 5/2007 | Alnas |
| 2007/0265003 A1 * | 11/2007 | Kezys et al. ............. 455/435.1 |

* cited by examiner

DEVICE MANAGEMENT SCHEDULING METHOD AND APPARATUS THEREOF

RELATED APPLICATION

The present disclosure relates to a subject matter contained in priority U.S. Provisional App. No. 60/760,942, filed on Jan. 23, 2006 and U.S. Provisional App. No. 60/762,517, filed on Jan. 27, 2006 and Korean Application No. 10-2006-0043155, filed on May 12, 2006, and Korean Application No. 10-2007-0005821, filed on Jan. 18, 2007 which are each herein expressly incorporated by reference in its entirety.

BACKGROUND

The present invention relates to a device management scheduling method and apparatus thereof.

In general, device management (DM) technology relates to showing (or indicating), to a device management (DM) server (or other network entity), the resources of a device management (DM) client (i.e., a terminal or other user device) as management objects that exist on a device management (DM) tree (or other type of hierarchy structure or logical format that is used for device management), allowing access thereto, and letting the DM server easily manage the terminal.

In such DM technology, the DM server may instruct the terminal to process commands for device management, while the terminal being managed, after immediately performing the corresponding command, may report the results thereof to the DM server. Also, the DM server may request the terminal to change, update, delete or otherwise process a particular function for device management.

One aspect of the present invention is the recognition by the present inventors of the following drawbacks in the related art DM technology. Namely, in the related art, the terminal may request the DM server for DM commands only when there is an error or malfunction within the terminal. As such, the diagnostic procedures of the related art terminal become more expensive, and do not allow effective resolution of diagnostic problems because such problems cannot be anticipated or discovered before they occur.

Thus, in order to address the above drawbacks, the present invention provides a server that generates a scheduling context (or other type of scheduling information) that includes device management information scheduled by the server to allow more effective scheduling to be performed by the terminal.

Also, the present invention provides a terminal that receives the scheduling context from the server and performs the scheduled device management procedures accordingly.

DETAILED DESCRIPTION

The present invention provides a terminal with a first module (or other hardware, software, or a combination thereof) that receives from a server and installs a scheduling context (or other type of scheduling framework) comprised of at least one scheduled device management (i.e., elements, means, etc.) and comprised of general information having a first node (or other type of point in a hierarchy structure) indicating a scheduling context state (or status) and a second node (or other type of point in a hierarchy structure) related to state control of the scheduling context; and a second module (or other hardware, software, or a combination thereof) that performs the scheduled device management according to the installed scheduling context.

The present invention provides a server comprising a device management scheduling enabler that generates and requests the terminal to install a scheduling context comprised of at least one scheduled device management and comprised of general information having a first node indicating a scheduling context state and a second node related to state control of the scheduling context, and that performs the scheduled device management according to the installed scheduling context.

Hereafter, exemplary embodiments of the present invention will be described in more detail with reference to the attached drawings. It can be clearly understood that these embodiments are merely exemplary and are not meant to limit the present invention.

Figure 1:
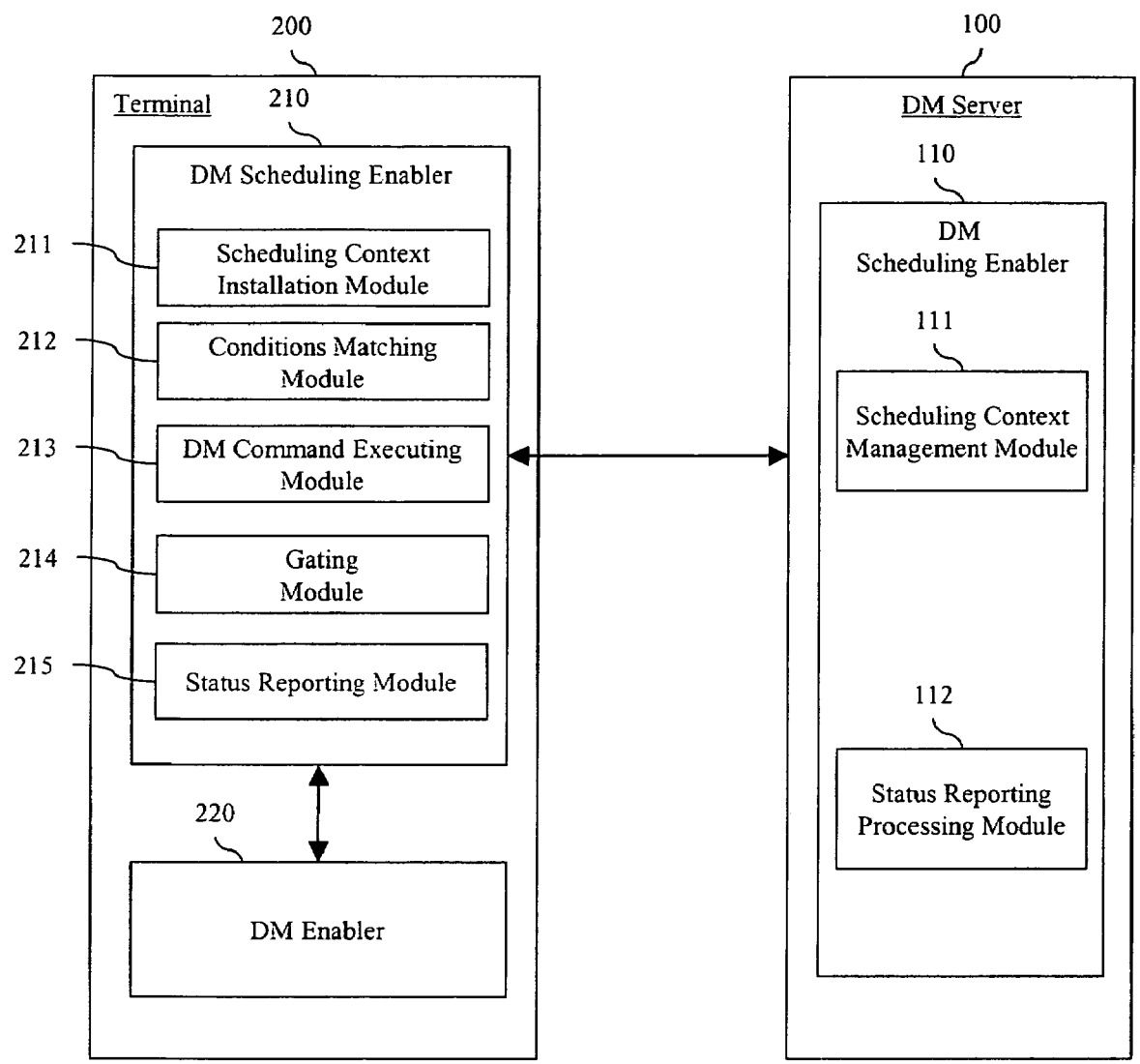
FIG. 1 shows exemplary conceptual structures of a server and a terminal according to the present invention.
Figure 2:
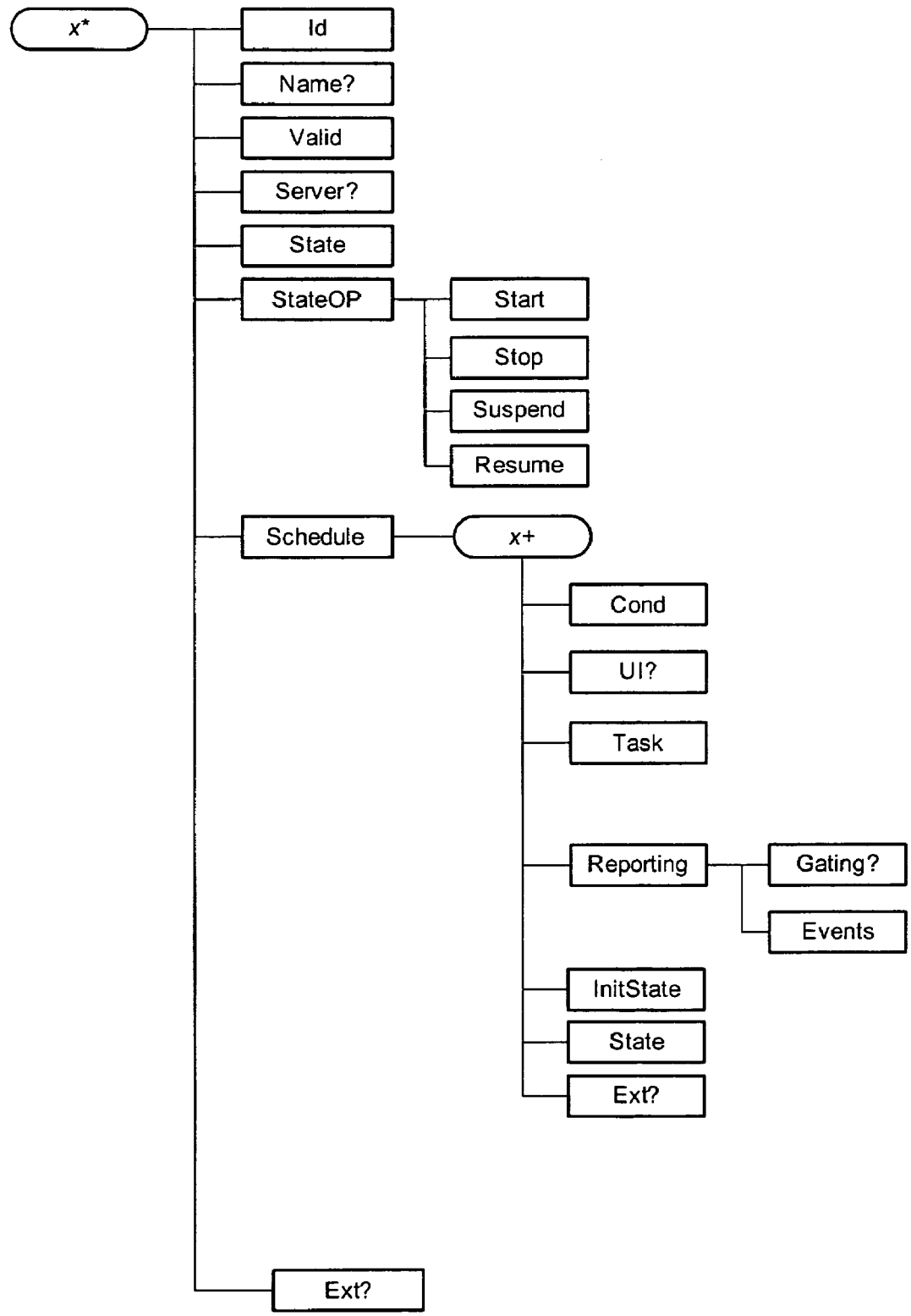
FIG. 2 shows the scheduling context as an exemplary device management tree structure according to the present invention.
Figure 3:
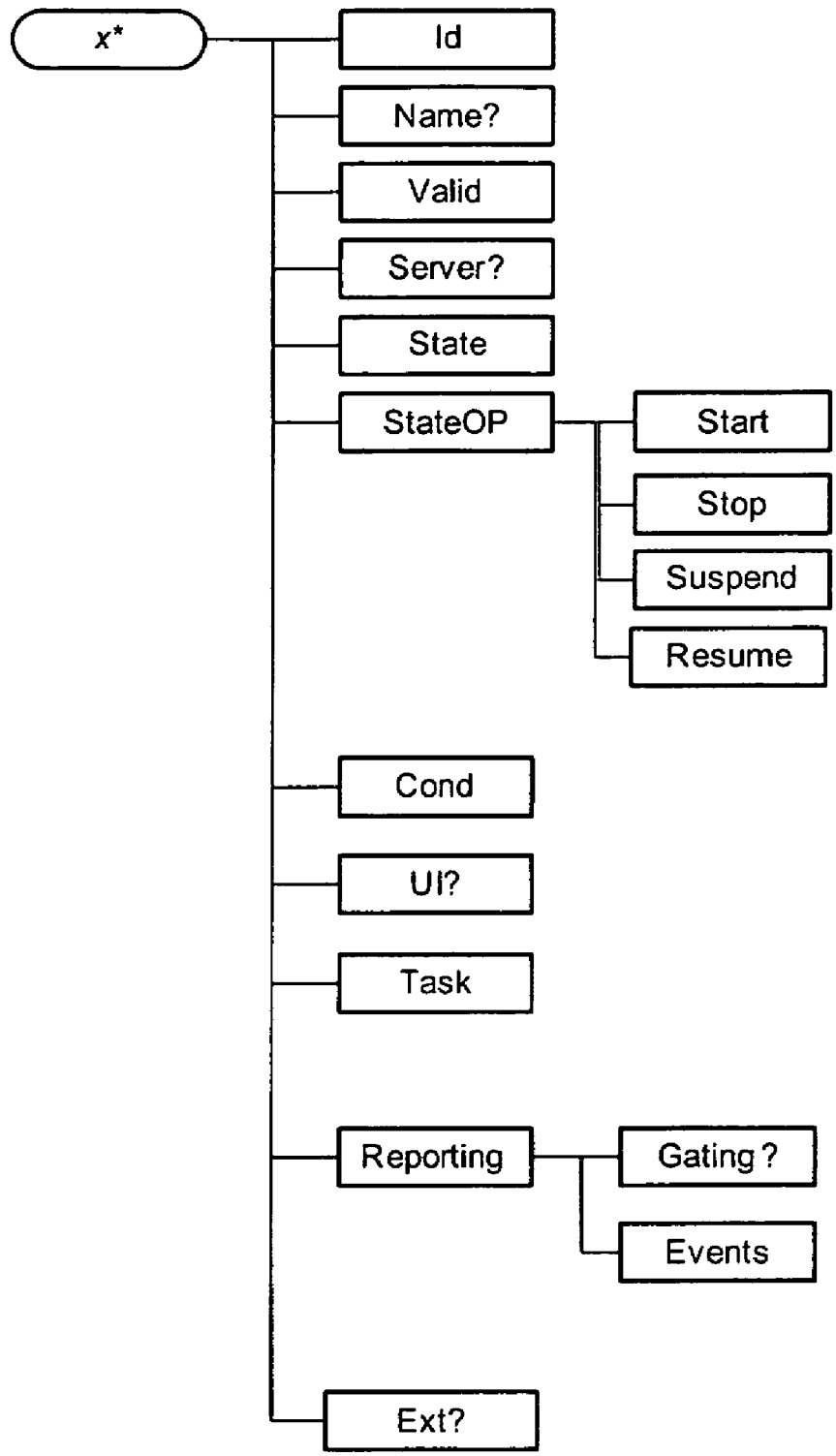
FIG. 3 shows the scheduling context as an another exemplary device management tree structure according to the present invention.

FIG. 1 shows exemplary conceptual structures of a server (i.e., a DM server) and a terminal (i.e., a DM client) according to the present invention, while FIG. 2 shows the scheduling context as an exemplary device management tree structure. Also, FIG. 3 shows the scheduling context as an another exemplary device management tree structure With the explanation of FIG. 1, FIGS. 2 through 3 will also be explained.

FIG. 1 shows an exemplary DM server (100) and a terminal (200) according to the present invention.

(1) Features of the DM Server

The DM server (100) may include a DM scheduling enabler (110) or other similar hardware, software, or any combination thereof.

The DM scheduling enabler (110) may be comprised of a scheduling context management module (111) and a status reporting processing module (112) and/or other types of similar hardware, software, or any combination thereof.

The scheduling context management module (111) may have a unit (i.e., portion, element, etc. or a combination thereof) that generates a scheduling context and requests the terminal (200) to install and execute it.

In more detail, the scheduling context management module (111) establishes a device management (DM) session (or some other type of communication term or period) with the terminal (200) according to a relative standard (such as DM standard) and then can request the terminal (200) to install the scheduling context via the established DM session.

The scheduling context may include general information and one or more scheduling components. Additional and/or alternative types of information, parameters, and the like may also be included. Here, the general information may include one or more of the following: an identifier element of the scheduling context, a name element, a corresponding server element, a validity period element, a state element indicating a state of the scheduling context, and a StateOP (node) element related to a state control of the scheduling context. The scheduling component may include one or more of the following: a Task element that designates a DM command, a Cond element that designates a condition(s) (i.e., reasons, factors, parameters, etc.) for executing the DM command, a User Interaction element that designates an interaction with the user, a Gating element that designates whether the results after executing the DM command should be reported (or indicated) to the server, and an Event element that instructs whether a state or event of the terminal should be reported to the server. However, it should be noted that the elements are not limited to only those listed above, but different additional elements or only some of the listed elements may be used.

Here, the command for the device management may be included in a message. In other word, the message may include at least one or more commands for device management. If the message is used, the task element designates the message. And, the conditions above may be timer-based, trap-based, or threshold-based. Additional or alternative basis for the conditions may be used as well. Also, the gating condition indicates whether the terminal (200), after executing the DM command, needs to report the execution results thereof.

Meanwhile, one or more scheduling components may exist within the scheduling context, and these scheduling components may have a binding logical relationship therebetween. Namely, the scheduling components may be interworked. For example, this 'interworking' may refer to when a module (or other entity) executes a command of a first schedule component if a condition of a first schedule is satisfied, and terminates a command of a second schedule component. This is particularly useful for threshold-based scheduling, whereby one or more components can be respectively executed in an alternating manner based upon a particular threshold value.

This concept of the 'interworking' may be applied to the scheduling context. That is, if a first scheduling context of at least one or more scheduling context is started, a second scheduling context of the at least one or more scheduling context is stopped.

The scheduling context may be revised (i.e., corrected, adapted, modified, etc.) by the scheduling context management module (111) as necessary, or such revision may be requested to the terminal (200). Also, the scheduling context management module (111) may request the terminal (200) to delete the installed scheduling context.

Additionally, when the scheduling context installed or re-installed in the terminal (200) changes or when an error occurs or if the scheduling context state changes, the scheduling context management module (111) may receive a message (or other indication) from the terminal (200) and perform appropriate processing thereof.

Above, it has been described the task element, the Cond element, the User Interaction element, the Gating element, and the Event element are included in the schedule component. But, it is noted that these elements may be directly included in the scheduling context, as illustrated in FIG. 3.

(2) Features of the Terminal

The terminal (200) may comprise a DM scheduling enabler (210) and a DM enabler (220). Here, it can be understood that other similar hardware, software, or any combination thereof may also be used.

The DM scheduling enabler (210) may be comprised of a scheduling context installation module (211), a condition matching module (212), a DM command executing module (213), a gating module, and a status reporting module (215). Here, it can be understood that other similar hardware, software, or any combination thereof may also be used.

The scheduling context installation module (211) is a unit (i.e., portion, element, etc. or a combination thereof) that may receive a scheduling context installation request from the server (110) (i.e., the DM scheduling enabler (110)) and perform appropriate processing thereof. Here, the scheduling context may be received trough the DM enabler (220), then may be delivered to the scheduling context installation module (211). The scheduling context installation module (211) uses the scheduling context to generate one or more nodes (or other types of hierarchy points) in a device management (DM) tree (or other type of hierarchy structure or logical format) that is used within the terminal (200). Here, the DM tree may be formed of general information nodes and one or more schedule components (scheduled device management).

Referring to FIG. 2, the DM tree (i.e., a scheduling context installation format) will be explained in more detail.

An exemplary DM tree is shown in FIG. 2. In more detail, the general nodes (as shown in FIG. 2) may be comprised of an Id node indicating an identifier of the installed scheduling context, an Name node indicating a name of the scheduling context, an Valid node indicating a valid period of the scheduling context, an Server node indicating the owner of the scheduling context, an State node indicating the current state of the scheduling context, and an StateOP node indicating a state control of the scheduling context. It can be clearly understood that the names and types of these nodes are merely exemplary.

Here, some examples of the current states of the scheduling context that can be indicated by the State node may be shown as in the following table. Namely, the scheduling context may be in one of the following states: Stopped, Running, or Suspended. Many other additional or alternative states are also possible.

| State | Description |
| --- | --- |
| Stopped | The Scheduling Context is inactive. Also, all the Schedule components included are inactive. The Scheduling Context just installed and configured, and reconfigured may be in this state. The Scheduling Context might have transitioned into this state when the scheduling job is finished. Out of this state, the Scheduling Context starts with each Schedule component having its own initial states. |
| Running | The Scheduling Context is active. More specifically, at least one Schedule component may be active. If none of the Schedule components are active, the Scheduling Context must automatically transition to the Stopped state. |
| Suspended | The Scheduling Context is inactive. All the Schedule components included maintain their states. Out of this state, the Scheduling Context will resume from the state where it was suspended. |

The states of the scheduling context may be changed (i.e., modified, adjusted, etc.) by the server (100), by the terminal (200) itself, or by the user of the terminal (200). Various conditions may be used to trigger such changes.

For example, if an error occurs while device management is being performed, or when device management is completed, or before any modification or deletion is performed due to a request by the server (100) or the user, the scheduling context may transition (i.e., change) to the stopped state.

The StateOP node may include a Start sub-node, a Stop sub-node, a Suspend sub-node, and a Resume sub-node.

Clearly, other types of additional or alternative nodes are possible. These sub-nodes may be described in more detail as follows:

| sub-node | Description | Applicable States |
|---|---|---|
| Start | This operation is used to start the Scheduling Context from the initial state, i.e. the Scheduling Context starts running with each state of the Schedule components set to their respective initial values. If successful, the Scheduling Context moves to Running state. | Stopped |
| Stop | This operation is used to stop the Scheduling Context. If successful, the Scheduling Context moves to the Stopped state, and the states of the included Schedule components must be changed to inactive. | Running, Suspended |
| Suspend | This operation is used to suspend the running of the Scheduling Context. Specifically, the state of the included Schedule component must be maintained during this state. If successful, the Scheduling Context moves to Suspended state. | Running |
| Resume | This operation is used to resume the running of the Scheduling Context from where it was suspended. If successful, the Scheduling Context moves to Running state. | Suspended |

By using each sub-node, a controlling of state of Scheduling Context may be accomplished (specified or implemented). In other words, if an execute (Exec) command (or other type of instructions) is received at (or for) a specific sub-node from the server (100), the terminal (200) executes the Exec command so that the scheduling context is transited (changed) into a state corresponding to the specific sub-node where the Exec command is received.

In this manner, when the scheduling context changes its state according to the StateOP node, this changed state may then be reflected in the State node of the scheduling context.

The schedule component may be comprised of one or more of the following: an Task node that indicates a DM command, an Condition node that designates a condition (or circumstance) for performing the DM command, an UI node that designates an interaction with the user, an Gating node that designates whether the results after performing the DM command should be reported (or informed) to the server, an Event node that instructs whether a state of the terminal should be reported (or informed) to the server, an State node that indicates the current state (or status) of the schedule component, and an InitState node that instructs (or informs about) an initial state of the schedule component. Clearly, other types of additional or alternative nodes are possible.

Here, the DM command is included in a message. Accordingly, the Task node may designate the message including the DM command. Meanwhile, it is above described the Task node, the Cond node, the User Interaction node, the Gating node, and the Event node are included in the schedule component. But, it is noted that these elements may be directly included in the scheduling context, as illustrated in FIG. 3.

The state of the schedule component that can be indicated by the State node may change according to the state of the scheduling context. Namely, if in the Running state upon starting of the scheduling context, the schedule component can be enabled according to the initial state indicated by the InitState node. Also, when the scheduling context is in a Stopped state, the schedule component may change to a disable state. When the scheduling context is in Suspended state, the schedule component can be maintained. Thereafter, when the scheduling context is resumed, the schedule component may return to its Suspended state. Meanwhile, the state of one schedule component may also change due to another schedule component. Namely, a first schedule component of the at least one or more schedule, when being activated, may deactivate a second schedule component of the at least one or more schedule component. This may be referred to as an interworking of the schedule components.

Before the scheduling context is installed due to instructions from the DM server (100), the scheduling context installation module (211) may selectively check the validity (or authenticity) of the scheduling context, if necessary.

The condition matching module (212) is a unit (i.e., portion, element, etc. or a combination thereof) that monitors or checks whether there is a matching of conditions in the schedule component for execution, and when the conditions for execution are matched, a request can be sent to the DM command executing module (213) for executing the DM command corresponding to the conditions. Here, the conditions for executing the DM commands may be timer-based, trap-based, or threshold-based. Additional or alternative basis for the conditions may be used as well.

The threshold-based procedure designates whether a value of a particular management entity within the terminal (200) reaches a previously set threshold value. Accordingly, the condition matching module (212) that executes the above procedure, monitors (or checks) the value of the particular management entity, compares such with the threshold value, and when the threshold value is reached, then a request to the DM command executing module (213) to execute the DM command can be made.

In the condition matching module (212) that performs the above procedure, one or more schedule components (i.e., a device management function or procedure that has been scheduled) exist, and if each respective schedule component contains conditions for executing the threshold-based procedure with respect to the same particular management entity, the conditions for executing the threshold-based procedure can be interworked with respect to the particular management entity and can also be monitored.

For example, let us assume that a first schedule component (i.e., device management that has been scheduled) and a second schedule component (i.e., device management that has been scheduled) respectively exist within the scheduling context. Also, let us assume that the first schedule component includes a first DM command and conditions for executing a first threshold-based procedure with respect to a particular management entity, and the second schedule component includes a second DM command and conditions for executing a second threshold-based procedure with respect to the same particular management entity. If so, when the value of the particular management entity satisfies the conditions for executing the first threshold-based procedure, the condition matching module (212) requests to the DM command executing module (213) to execute the first DM command. Also, when the value of the particular management entity satisfies the conditions for executing the second threshold-based procedure, the condition matching module (212) requests to the DM command executing module (213) to execute the second DM command.

Meanwhile, for monitoring the conditions for executing the above procedures, additional requirements for the condition matching module (212) to execute the commands may be needed. Namely, for the condition matching module (212) to execute the commands, the scheduling context may include an item(s) that instruct how the conditions for execution are to be monitored. Also, the scheduling context may include requests for the condition matching module (212) (to execute the commands) indicating which measurement values or variables should be monitored at certain time intervals or monitored occasionally.

The DM command executing module (213) is a unit (i.e., portion, element, etc. or a combination thereof) that cooperates with the DM enabler (220) to execute the DM command if there is a matching of the conditions for executing the DM command. In other world, the DM command executing module (213) sends the DM command to the DM enabler (220), and receives a result obtained by executing the DM command from the DM enabler (220).

Upon execution of the DM command, the gating module (214) is a unit (i.e., portion, element, etc. or a combination thereof) that determines whether the executed result that occurs or the state of the terminal (200) should be reported to the DM server (100). As described above, the gating module (214), based upon the Gating node, may determine whether to report about the results of the execution of the command. Alternatively, the gating module (214), based upon the Event node, may determine whether to report about the state.

The status reporting module (215) is a unit that reports to the DM server (100) about the state of the terminal (22) or about the execution results. As explained above, the status reporting module (215) may report to the DM server (100) when the state of the scheduling context or the state of the scheduling component changes. Also, as a result of executing the DM command, if it is determined that a report by the gating module (214) is deemed necessary, the status reporting module (215) uses the DM command execution results (i.e., a Status message, a Result message, or an Alert message) to generate a report message, which can be sent to the DM server (100). Here, the report message or the state of the terminal (200) can be transmitted to the DM server (100) by using a Generic Alert Message or by some other type of message or indication.

The DM enabler client (220) is a unit that cooperates with the command execution module (214) to execute the DM commands. In more detail, the DM enabler client (220) executes a DM command received from the command execution module (214), and then the results thereof is returned back (i.e. reported) to the command execution module (214).

Thus far, the constituting elements of the present invention DM system has been described with respect to a DM server (100) having a scheduling context management module (111) and a status reporting processing module (112), and a terminal (200) having a DM scheduling enabler (210) (containing a scheduling context installation module (211), a condition matching module (212), a DM command executing module (213), a gating module (214), and a status reporting module (215)), and a DM enabler (220). However, these elements may also be implemented as any combination of a processor (not shown), a network interface (not shown), and a storage device (not shown).

Features of the Method According to the Present Invention

The operation of the DM system of the present invention will be explained in more detail with reference to FIGS. 4 and 5. It should be noted that although FIGS. 4 and 5 do not depict the details of all elements, each procedure may be performed by various elements within the DM server (100) and the terminal (200) described previously.

Figure 4:
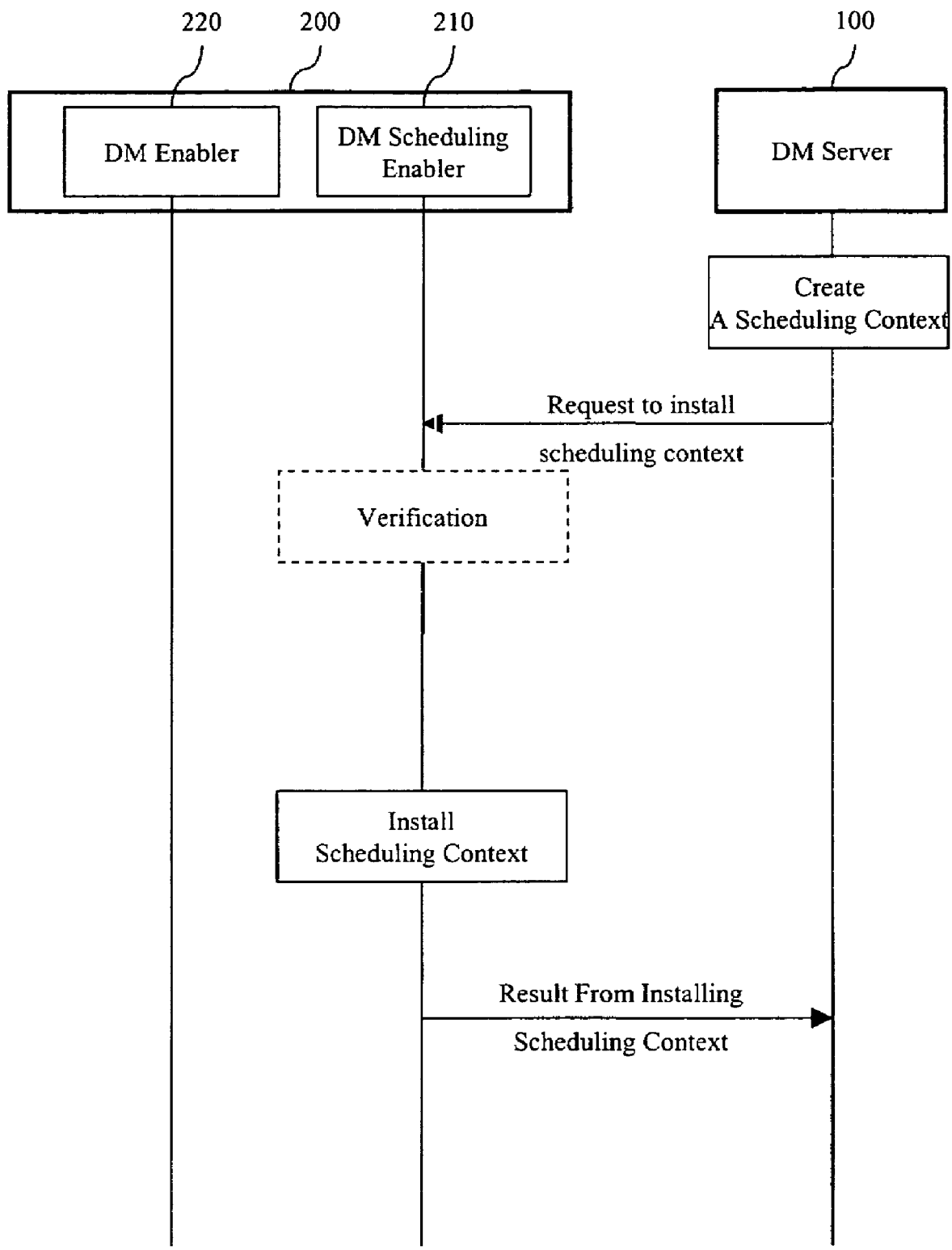
FIG. 4 shows an exemplary flow chart of a scheduling context installation procedure according to the present invention.
Figure 5:
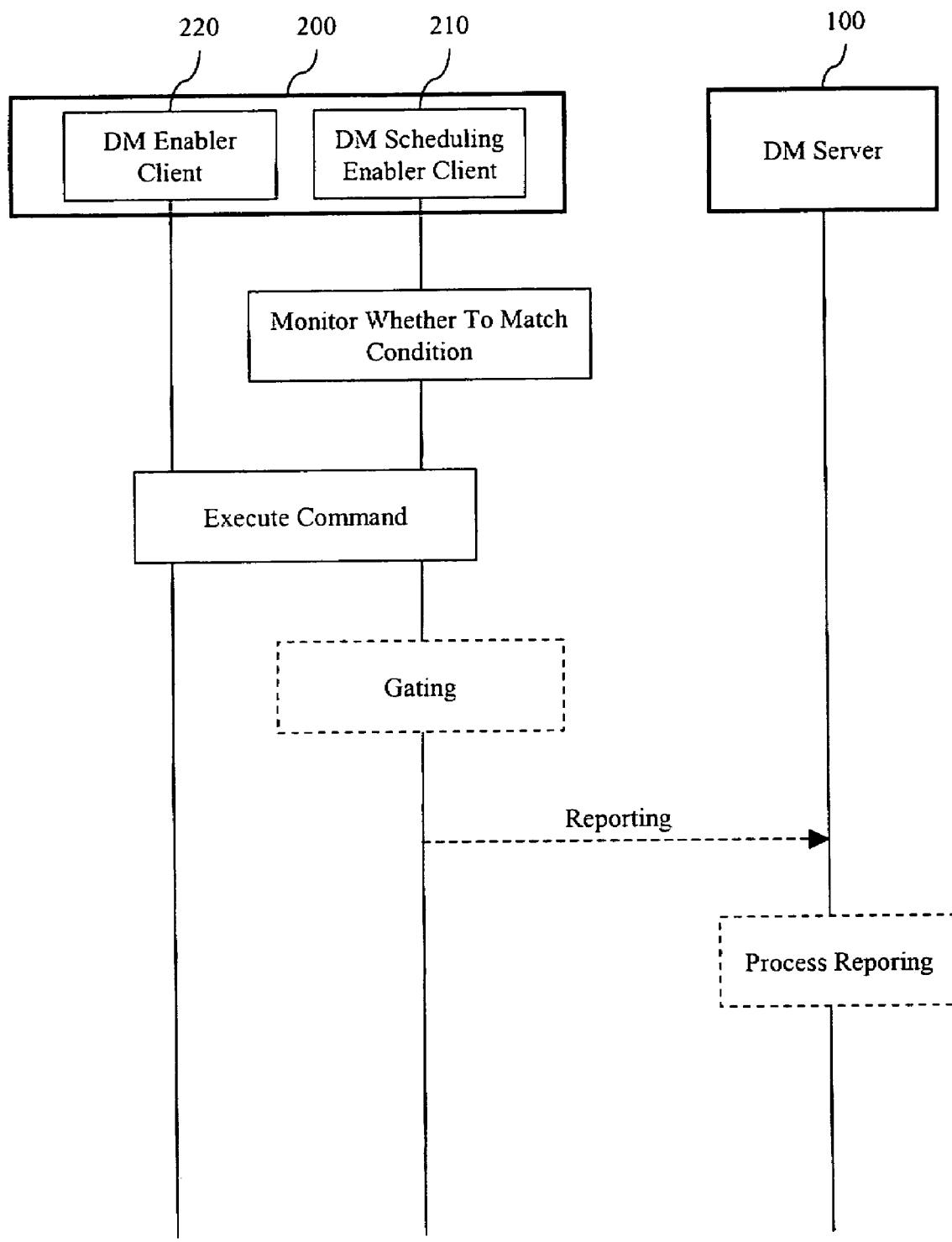
FIG. 5 shows a flow chart for an exemplary method for performing device management scheduling according to the present invention.

FIG. 4 is a flow chart showing a scheduling context installing procedure according to the present invention, and FIG. 5 is a flow chart showing a method for performing a scheduled device management according to the present invention.

As shown in FIG. 4, in the installing procedure of the present invention, the DM server (100) establishes a DM session (or some other type of communication link) with the DM enabler (220), and the scheduling context is installed.

An exemplary scheduling context installing procedure of the present invention will be explained in more detail as follows.

1) The DM server (100) (in particular, the scheduling context management module (111) thereof) generates (or creates) a scheduling context.

2) The DM server (100) establishes a DM session with the terminal (200), and uses the DM protocol (or other appropriate communications protocol) to deliver a request (or instruction) to install the generated scheduling context to the DM scheduling enabler client (210) of the terminal (200). Here, the request can be delivered through the DM enabler (220) to the DM scheduling enabler client (210).

3) The DM scheduling enabler (210) of the terminal (200) (in particular, the scheduling context installation module (211) thereof) checks the validity of the scheduling context.

4) Upon completion of the validity check, the DM scheduling enabler (210) of the terminal (200) (in particular, the scheduling context installation module (211) thereof) installs the scheduling context in the DM tree (or other type of hierarchy structure or logical format) of the terminal (200). Here, an example of the DM tree is shown in FIG. 2 as described above.

5) When such installation is completed, the DM scheduling enabler (210) of the terminal (200) (in particular, the scheduling context installation module (211) thereof) reports the results of the scheduling context installation to the DM server (100).

Referring to FIG. 5, an exemplary schedule component processing method of the present invention will be described.

1) The DM scheduling enabler (210) (in particular, the condition matching module (212) thereof) checks the Condition node in the DM tree that represents a scheduling context installation, and monitors whether there is a match with the conditions for execution thereof. Here, such conditions may be timer-based, trap-based, or threshold-based. Other additional or alternative conditions are also possible.

2) In accordance with such monitoring, if it is confirmed that there is a match of the condition for execution, the DM scheduling enabler (210) (in particular, the DM command executing module (213) thereof) cooperates with the DM enabler (220), to thus execute the DM command.

3) When the execution of the DM command is completed, the DM scheduling enabler (210) (in particular, the gating module (214) thereof) determines whether to report the results of command execution to the DM server (100).

4) According to such determination, the DM scheduling enabler (210) (in particular, the status reporting module (215) thereof) reports the execution results or the state of the terminal (200) to the DM server (100). Namely, the report of the execution results may inform the DM server (100) about whether the DM command was properly performed, or the reason(s) why an error has occurred. Such reporting procedure may use the execution results to create a report message (or some other type of indication), which may then be sent to the DM server (100).

5) Upon receiving the status report, the DM server (100) (in particular, the status reporting processing module (120) thereof) performs parsing (or other processing) on the received status report.

Figure 6:
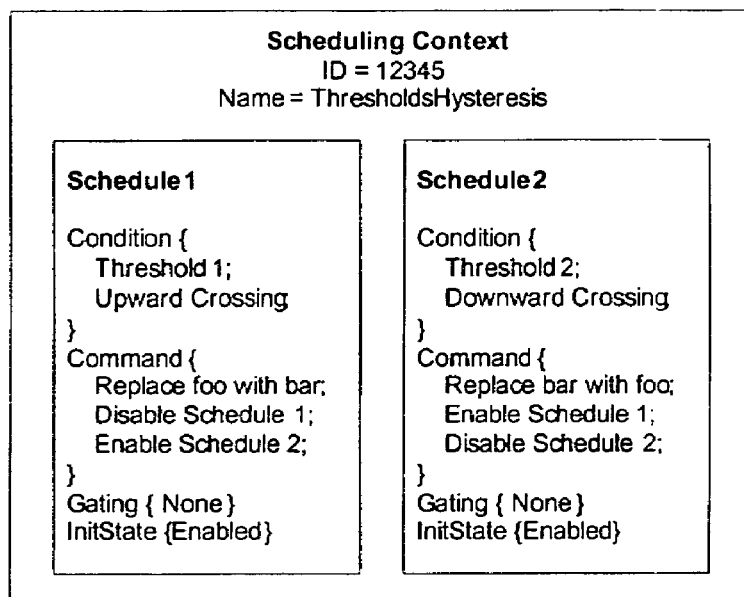
FIG. 6 shows an exemplary method for performing a threshold-based device management scheduling procedure.
Figure 6:
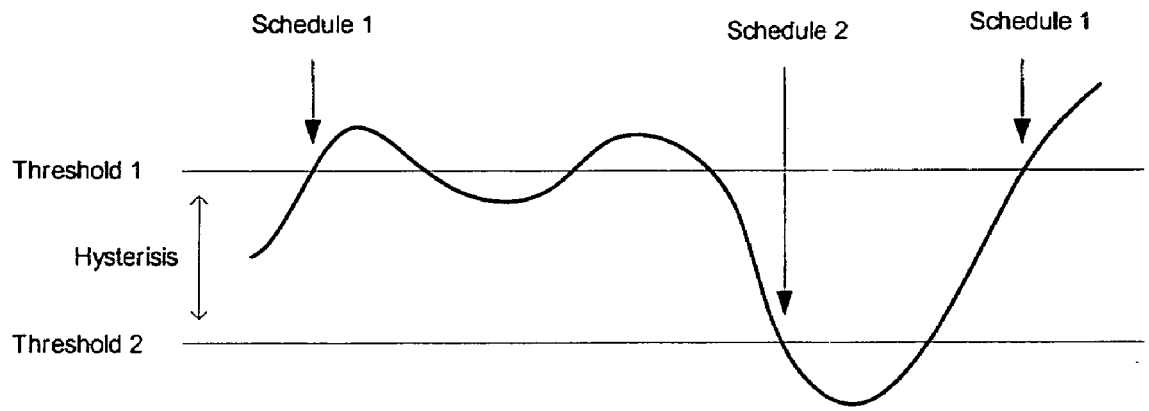
Figure 7:
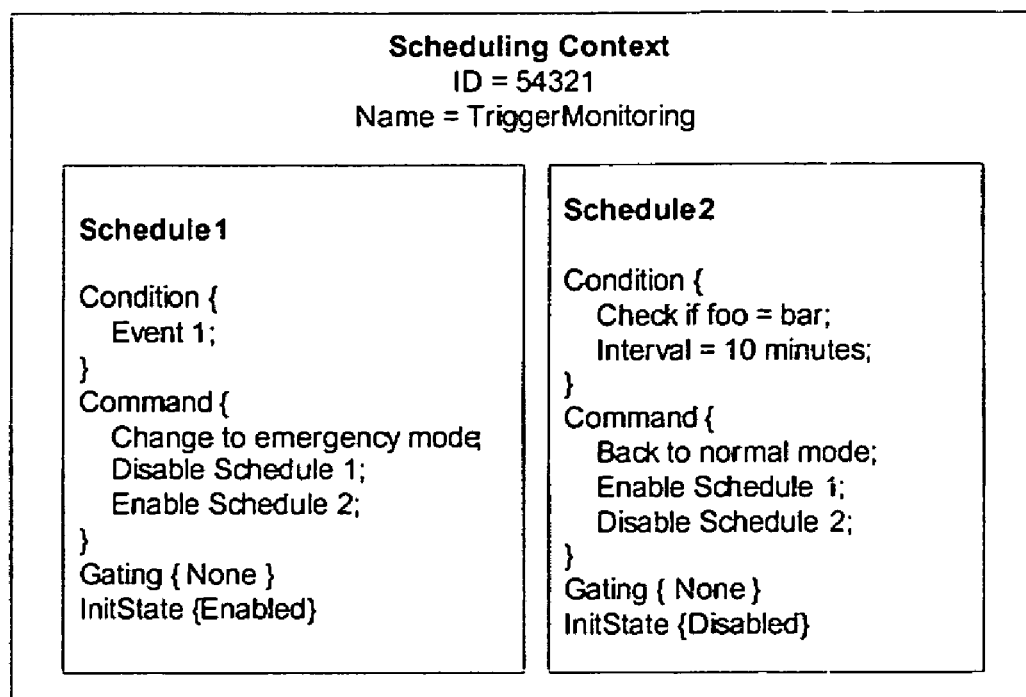
FIG. 7 shows another exemplary method for performing a trap-based device management scheduling procedure.
Figure 7:
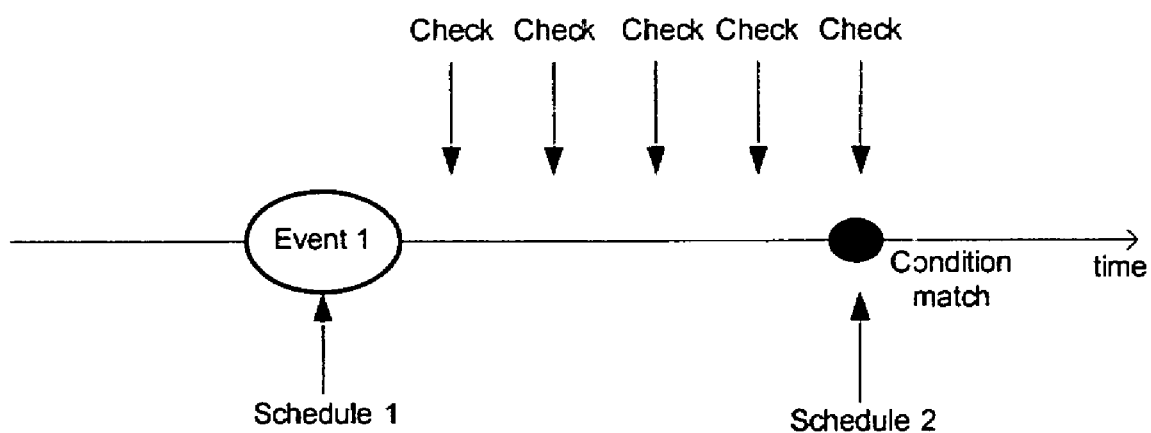

FIG. 6 shows an exemplary method for performing threshold-based device management scheduling, while FIG. 7 shows an exemplary method for performing trap-based device management scheduling.

As shown in FIG. 6, the scheduling context may be comprised of two schedule components. In more detail, the first schedule component (i.e., scheduled device management) of the scheduling context allows execution of a DM command that changes the variable 'foo' to 'bar', if the value of a particular management entity, for example, if the threshold value when a radio interface entity having a stable throughput, exceeds 1. Also, the second schedule component of the scheduling context allows execution of a DM command that changes the variable 'bar' to 'foo', if the value of a particular management entity goes back to a stable state. Also, due to hysteresis, the first and second schedule components may ignore the situations where the throughput of a particular radio interface exceeds threshold 1 but then again falls below threshold 1, if such difference is considered to be relatively small (i.e., if within the hysteresis (allowed) range). This is to exclude the causes for system instability due to the effects of noise (or other interference).

An exemplary execution procedure of the first and second components will be described.

(1) The first component and the second component change from an initial state to an active (or enabled) and are executed.

(2) If the throughput of a particular radio (wireless) interface device exceeds threshold 1, the DM command of the first schedule component is executed.

(3) Upon executing the DM command, the variable 'foo' changes to 'bar', the first schedule component becomes inactive (or disabled), and the second schedule component is executed.

(4) If the throughput of a particular radio (wireless) interface device falls below threshold 2, the DM command of the second schedule component is executed.

(5) Upon executing the DM command, the variable 'bar' changes to 'foo', the second schedule component becomes inactive (or disabled), and the first schedule component is executed.

FIG. 7 shows a scheduling context that comprises two schedule components (i.e., scheduled device management). In more detail, the first schedule component of the scheduling context allows the terminal operation mode to be set to emergency mode when a particular event 1 occurs, and executes a second schedule component. The second schedule component of the scheduling context periodically checks whether there is an abnormal state, and if the abnormal state is removed (or resolved), the terminal is allowed to return to its normal mode from the emergency mode.

An exemplary execution procedure of the first and second schedule component is as follows.

(1) When the scheduling context is installed, the second component changes from its initial state to an inactive (or disable) state, the first schedule component changes from its initial state to an active or enabled state and is executed.

(2) When the particular event 1 occurs, the DM command of the first schedule component is executed.

(3) Upon execution of the DM command, the terminal operation mode changes to emergency mode, the first schedule component becomes inactive (or disabled), and the second schedule component becomes active (or enabled).

(4) When the second schedule component changes to active state and is executed, the second schedule component checks whether the state of the terminal is normal, whereby this checking is performed in a periodic manner, such as every 10 minutes.

(5) Upon this periodic checking, if the state of the terminal is found to be normal, the DM command of the second component is executed.

(6) When the DM command executed, the terminal operation mode changes from emergency mode to normal mode, the second schedule component is disabled, and the first schedule component is enabled.

The method of the present invention may be implemented as software, hardware, or any combination thereof. For example, the method of the present invention may be implemented as codes or instructions within a software program that is stored in a storage medium (e.g., an internal memory of the terminal, a Flash memory, a hard disk, etc.) and executed by a processor (e.g., a microprocessor within the terminal, etc.).

As for the effects of the present invention, by providing (ahead of time), to the terminal, DM commands to be executed within the terminal and conditions (included within the scheduling context) for executing such DM commands, and having the terminal execute these DM commands according to the conditions, the result would be that the terminal recognizes such commands as if they are being immediately provided from the DM server, whenever the terminal requests a DM command(s) from the DM server.

Also, as the present invention allows DM commands to be executed according to a particular threshold value, errors that may occur in the terminal may be effectively prevented (or at least minimized).

Additionally, by including one or more threshold-based schedule components within the scheduling context, and allowing the schedule components to be respectively executed in an alternating manner based upon a particular threshold value, the DM commands may be executed a more systematic manner and thus handled more effectively.

It should be noted that the features and concepts of the present invention are related to various types of standards with respect to device management (DM) that are governed by certain corresponding standards organizations. As such, various corresponding standards and the concepts specified therein are also part of the present invention.

Although this specification specifies various names of commands, nodes, sub-nodes, etc. related to device management (DM), it can be clearly understood that such names and labels are merely exemplary. The features of the present invention are not meant to be so limiting, as other equivalent names or labels may be used, as long as they refer to the same or equivalent functions and/or features.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A terminal comprising:
   a first module adapted to install through a device management (DM) enabler, upon receipt from a device management (DM) scheduling enabler of a server, at least one or more scheduling contexts, each of which comprising general information and at least one scheduled device management, wherein the general information includes a first node indicating a current state of the scheduling context and a second node related to controlling a state of the scheduling context, wherein the general information further includes a validity period of the scheduling context; and
   a second module adapted to perform the scheduled device management according to the scheduling context installed by the first module,
   wherein a first schedule component of the scheduling context allows the terminal to perform in a first type of scheduled device management procedure, and a second schedule component of the scheduling context allows the terminal to perform in a second type of scheduled device management procedure,
   said first and second types of scheduled device management procedures are based on a threshold-based device management or based on a periodic checking-based device management,
   for said threshold-based device management, said first type of scheduled device management procedure is performed if a throughput of a particular radio interface exceeds a first threshold, and said second type of scheduled device management procedure is performed if the throughput of the particular radio interface exceeds a second threshold, and
   for said periodic checking-based device management, said first type of scheduled device management procedure is performed to set an operation mode of the terminal to an emergency mode due to a detection of an abnormal state as a result of periodic checking, and said second type of scheduled device management procedure is performed to set the operation mode of the terminal to a normal mode after detecting a removal or resolving of the abnormal state as a result of periodic checking,
   wherein if the validity period of the scheduling context expires, the scheduling context is automatically deleted.

2. The terminal of claim 1, wherein the scheduling context is installed in a form of a device management tree used to perform the scheduled device management, and the device management tree has nodes and sub-nodes in a hierarchy relationship.

3. The terminal of claim 1, wherein the general information further includes at least one of:
   an identifier of the scheduling context;
   a name of the scheduling context; and
   a corresponding server of the scheduling context.

4. The terminal of claim 1, wherein the state of the scheduling context is one among stopped, running, and suspended.

5. The terminal of claim 1, wherein upon installation of the scheduling context, the scheduling context is in a stopped state.

6. The terminal of claim 1, wherein the scheduling context transitions to a stopped state if an error occurs while the scheduled device management is being performed, if the scheduled device management is completed, or if before performing modification or deletion due to a request from the server or a user.

7. The terminal of claim 1, wherein the state of the scheduling context can be transitioned by a user.

8. The terminal of claim 1, wherein the second node comprises at least one of an enable node, and a disable node.

9. The terminal of claim 1, wherein the second node comprises at least one among a start node, a stop node, a suspend node, and a resume node.

10. The terminal of claim 9, wherein the start node, the stop node, the suspend node, and the resume node are triggered by an execution command.

11. The terminal of claim 1, wherein the first module transmits a message to the server if there is a state transition of the installed scheduling context.

12. The terminal of claim 1, wherein the scheduling context further comprises at least one of a user interaction node that specifies an interaction with a user, a gating node that specifies whether a result from executing a command for device management should be reported to the server, and an event node that instructs whether to report a state of the terminal or an event to be occurred in the terminal to the server, and
   the scheduled device management comprises a message including at least one command for device management, and a condition for executing the command.

13. The terminal of claim 1, wherein the at least one or more scheduling contexts interwork with each other.

14. The terminal of claim 13, wherein if the second module starts a first scheduling context of the at least one or more scheduling contexts, the second module stops a second scheduling context of the at least one or more scheduling contexts.

15. The terminal of claim 1, wherein for said threshold-based device management, the first and second schedule components ignore the situations where the throughput of the particular radio interface that initially exceeds the first threshold but later falls below the first threshold is considered to be relatively small.

16. The terminal of claim 1, wherein for said periodic checking-based device management, when the terminal operation mode changes from the emergency mode to the normal mode, the second schedule component is disabled and the first schedule component is enabled.

17. A server device including a processor, the server device comprising:
   a device management scheduling enabler adapted to generate at least one or more scheduling contexts, each of which comprising general information and at least one or more scheduled device management, the device management scheduling enabler further adapted to request a terminal to install the at least one or more scheduling contexts such that the scheduled device management is performed within the terminal, wherein the general information includes a first node indicating a state of the scheduling context and a second node related to controlling a state of the scheduling context, wherein the general information further includes a validity period of the scheduling context, a first schedule component of the scheduling context allows the terminal to perform in a first type of scheduled device management procedure, and a second schedule component of the scheduling context allows the terminal to perform in a second type of scheduled device management procedure, said first and second types of scheduled device management procedures are based on a threshold-based device management or based on a periodic checking-based device management, for said threshold-based device management, said first type of scheduled device management procedure is performed if a throughput of a particular radio interface exceeds a first threshold, and said second type of scheduled device management procedure is performed if the throughput of the particular radio interface exceeds a second threshold, and for said periodic checking-based device management, said first type of scheduled device management procedure is performed to set an operation mode of the terminal to an emergency mode due to a detection of an abnormal state as a result of periodic checking, and said second type of scheduled device management procedure is performed to set the operation mode of the terminal to a normal mode after detecting a removal or resolving of the abnormal state as a result of periodic checking, wherein if the validity period of the scheduling context expires, the scheduling context is automatically deleted.

18. The sever device of claim 17, wherein the second node comprises at least one of an enable node, and a disable node.

19. The server device of claim 17, wherein the second node comprises at least one among a start node, a stop node, a suspend node, and a resume node.

20. The server device of claim 17, wherein an execution command is sent to at least one among a start node, a stop node, a suspend node, and a resume node, in order to transition a state of the scheduling context within the terminal.

21. The server device of claim 20 wherein the server receives a result of the state transition of the scheduling context from the terminal, or receives an event to be occurred in the terminal.

22. The server device of claim 17, wherein for said threshold-based device management, the first and second schedule components ignore the situations where the throughput of the particular radio interface that initially exceeds the first threshold but later falls below the first threshold is considered to be relatively small.

23. The server device of claim 17, wherein for said periodic checking-based device management, when the terminal operation mode changes from the emergency mode to the normal mode, the second schedule component is disabled and the first schedule component is enabled.

24. A method for performing scheduled device management at a terminal, the method comprising:
receiving, by the terminal, a request to install at least one or more scheduling contexts including general information and scheduled device management through a device management enabler, wherein the general information includes a first node indicating a current state of the scheduling context and a second node for controlling the state of the scheduling context, wherein the general information further includes a validity period of the scheduling context;

installing, by the terminal, the at least one or more scheduling contexts based on the received request; and performing, by the terminal, the scheduled device management according to the installed at least one or more scheduling contexts, wherein a first schedule component of the scheduling context allows the terminal to perform in a first type of scheduled device management procedure, and a second schedule component of the scheduling context allows the terminal to perform in a second type of scheduled device management procedure, said first and second types of scheduled device management procedures are based on a threshold-based device management or based on a periodic checking-based device management, for said threshold-based device management, said first type of scheduled device management procedure is performed if a throughput of a particular radio interface exceeds a first threshold, and said second type of scheduled device management procedure is performed if the throughput of the particular radio interface exceeds a second threshold, and for said periodic checking-based device management, said first type of scheduled device management procedure is performed to set an operation mode of the terminal to an emergency mode due to a detection of an abnormal state as a result of periodic checking, and said second type of scheduled device management procedure is performed to set the operation mode of the terminal to a normal mode after detecting a removal or resolving of the abnormal state as a result of periodic checking, wherein if the validity period of the scheduling context expires, the scheduling context is automatically deleted.

25. The method of claim 24, further comprising:
stopping, by the terminal, the scheduling context if an error occurs while the scheduled device management is being performed, if the scheduled device management is completed or before performing modification or deletion due to a request from a server or a user.

26. The method of claim 24, further comprising:
transmitting, by the terminal, a message to a server if there is a state transition of the installed scheduling context, or if a particular event occurs in the terminal.

27. The method of claim 24, wherein the performing step comprises:
starting a first scheduling context of the at least one or more scheduling contexts; and
performing the scheduled device management according to the first scheduling context.

28. The method of claim 27, further comprising:
stopping, by the terminal, a second scheduling context of the at least one or more scheduling contexts in response to the starting of the first scheduling context of the at least one or more scheduling contexts.

29. The method of claim 24, wherein the performing step further comprises:
starting the scheduling context;
suspending the scheduling context, if a request for suspending the started scheduling context is received; and resuming the scheduling context, if a request for resuming the suspended scheduling context is received.

30. The method of claim 24, wherein for said threshold-based device management, the first and second schedule components ignore the situations where the throughput of the particular radio interface that initially exceeds the first threshold but later falls below the first threshold is considered to be relatively small.

31. The method of claim 24, wherein for said periodic checking-based device management, when the terminal operation mode changes from the emergency mode to the normal mode, the second schedule component is disabled and the first schedule component is enabled.

32. A method for performing scheduled device management at a terminal, the method comprising:
   receiving, by the terminal from a server, an execution command in any one of a start sub-node, a stop sub-node, a suspend sub-node and a resume sub-node; and
   starting, stopping, suspending, or resuming, by the terminal, a scheduling context by executing the execution command at a location where the execution command is received, wherein the scheduling context has a corresponding validity period,
   wherein a first schedule component of the scheduling context allows the terminal to perform in a first type of scheduled device management procedure, and a second schedule component of the scheduling context allows the terminal to perform in a second type of scheduled device management procedure,
   said first and second types of scheduled device management procedures are based on a threshold-based device management or based on a periodic checking-based device management,
   for said threshold-based device management, said first type of scheduled device management procedure is performed if a throughput of a particular radio interface exceeds a first threshold, and said second type of scheduled device management procedure is performed if the throughput of the particular radio interface exceeds a second threshold, and
   for said periodic checking-based device management, said first type of scheduled device management procedure is performed to set an operation mode of the terminal to an emergency mode due to a detection of an abnormal state as a result of periodic checking, and said second type of scheduled device management procedure is performed to set the operation mode of the terminal to a normal mode after detecting a removal or resolving of the abnormal state as a result of periodic checking,
   wherein if the validity period of the scheduling context expires, the scheduling context is automatically deleted.

33. The method of claim 32, further comprising:
   reflecting, by the terminal, a current state of the scheduling context in a state node.

34. The method of claim 33, wherein the state node has a state among any one of running, stopping, and suspending.

35. The method of claim 32, wherein for said threshold-based device management, the first and second schedule components ignore the situations where the throughput of the particular radio interface that initially exceeds the first threshold but later falls below the first threshold is considered to be relatively small.

36. The method of claim 32, wherein for said periodic checking-based device management, when the terminal operation mode changes from the emergency mode to the normal mode, the second schedule component is disabled and the first schedule component is enabled.

* * * * *